(12) United States Patent
Kavallierou et al.

(10) Patent No.: US 8,943,130 B2
(45) Date of Patent: Jan. 27, 2015

(54) METHOD AND APPARATUS FOR TRANSFERRING MATERIAL

(75) Inventors: Michael Adam Kavallierou, London (GB); Murray James Hume, London (GB)

(73) Assignee: Sony Computer Entertainment Europe Limited (GB)

( * ) Notice: Subject to any disclaimer, the term of this patent is extended or adjusted under 35 U.S.C. 154(b) by 1399 days.

(21) Appl. No.: 12/512,157

(22) Filed: Jul. 30, 2009

(65) Prior Publication Data

US 2011/0029609 A1 Feb. 3, 2011

(51) Int. Cl.
*G06F 15/16* (2006.01)
*H04L 29/08* (2006.01)
*H04N 1/00* (2006.01)
*H04N 21/478* (2011.01)
*H04L 29/06* (2006.01)

(52) U.S. Cl.
CPC .............. *H04L 67/34* (2013.01); *H04N 1/0044* (2013.01); *H04N 21/4781* (2013.01); *H04L 67/38* (2013.01)
USPC ............ 709/204; 709/218; 370/311; 455/574

(58) Field of Classification Search
CPC .................... H04N 1/0044; H04N 21/4781
USPC ............................................ 709/204
See application file for complete search history.

(56) References Cited

U.S. PATENT DOCUMENTS

| | | | |
|---|---|---|---|
| 2003/0125074 A1* | 7/2003 | Tanada et al. ................. | 455/552 |
| 2007/0025198 A1* | 2/2007 | Tsukazaki et al. ......... | 369/30.05 |
| 2008/0028041 A1* | 1/2008 | Jung et al. ..................... | 709/218 |
| 2008/0039154 A1* | 2/2008 | Oh ................................ | 455/574 |

* cited by examiner

*Primary Examiner* — Arvin Eskandarnia
(74) *Attorney, Agent, or Firm* — Lerner, David, Littenberg, Krumholz & Mentlik, LLP

(57) ABSTRACT

A method of transferring a preview version of material from a first entertainment apparatus to a second entertainment apparatus is disclosed. In said first entertainment apparatus, said method comprises the steps of: extracting said preview material from a package containing both a full version of the material and said preview version of the material, said preview version being an illustration of said full version of the material; and uploading at least part of said preview material to said second apparatus over a network.

15 Claims, 11 Drawing Sheets

RECIPIENT SIDE

METHOD AND APPARATUS FOR TRANSFERRING MATERIAL

BACKGROUND OF THE INVENTION

1. Field of the Invention

The present invention relates to a method and apparatus for transferring preview material.

2. Description of the Prior Art

Currently, it is possible to obtain demonstration versions of video games through a number of different sources. For example, it is possible to obtain playable demonstrations of games from discs attached to the front of magazines or to download a large number of playable demonstration video games over the Playstation Network ("PSN" hereinafter).

With users becoming more and more familiar with obtaining and using the demonstration video games before purchasing a "full version", it is desirable to find alternative and innovative ways of distributing this preview material.

This invention seeks to provide such an alternative.

SUMMARY OF THE INVENTION

According to one aspect of the invention, there is provided a method of transferring a preview version of material from a first entertainment apparatus to a second entertainment apparatus, whereby, in said first entertainment apparatus, said method comprises the steps of:

extracting said preview version of the material from a package containing both a full version of the material and said preview version of the material, said preview version being an illustration of said full version of the material; and uploading at least part of said preview version of the material to said second apparatus over a network.

This is advantageous because it allows one user to easily transfer to a friend a demonstration or preview of the material. As the user transfers the preview to a friend, the user knows the likes and dislikes of his or her friend and so will improve the distribution of the preview to relevant and targeted users. This improves the efficiency in which material is distributed.

The network may be a peer-to-peer type network.

This type of network is suited to this type of distribution because peer-to-peer networks utilise the asymmetry associated with broadband networks.

The method may comprise storing locally to said first entertainment apparatus said preview version of the material, and whereby at least part of said stored preview version of the material is pushed to the second entertainment apparatus over the network.

By transferring the stored material this allows the user of the first apparatus to perform other activities such as watch a movie, play a different game etc whilst the transfer takes place.

The preview version of the material may be stored in a directory that is exclusively used for distribution of material over the network.

This ensures that no system files can be accessed over the network, thus improving the security of the entertainment apparatus.

Before said preview version of the material is uploaded to said second entertainment apparatus, the method may comprise: transferring a test signal to said second entertainment apparatus; and uploading said preview version of the material in response to receiving, from said second apparatus, a positive response to said test signal.

This allows the preview version of the material to be transferred to only entertainment apparatuses that wish to accept or are in a position to accept the preview version of the material.

The test signal may comprise a wake-up over Internet signal.

The method may comprise sending an identification signal identifying said second entertainment apparatus to a server, and receiving from said second entertainment apparatus a control signal, whereby said at least part of said preview version of the material is uploaded to the second entertainment apparatus in dependence on said control signal.

This allows the recipient device to control the transfer. This improves efficiency of the transfer.

The material may be a video game.

According to another aspect of the invention, there is provided a method of transferring a preview version of a video game from a first entertainment apparatus to a second entertainment apparatus, whereby, in said second entertainment apparatus, said method comprises the steps of: downloading, from said first entertainment apparatus over a network, at least part of said preview version of said video game, the preview version being an illustration of a full version of the video game; and storing the received preview version of the video game in non-volatile memory, wherein before said preview version is transferred, the method comprises the steps of: receiving a test signal from the first apparatus; sending a positive response to the test signal to the first apparatus; and receiving the preview version of the video game in response to the positive response and said test signal from said first apparatus includes a wake up over internet signal and an identifier that uniquely identifies said first apparatus, said method of transfer further comprising: reviewing user preferences stored in said non-volatile memory, and where said user preferences indicate that preview versions of video games are automatically allowed from the identified said first entertainment apparatus, sending said positive response.

This allows the preview version of the video game to be transferred efficiently across a network. This improves the distribution of the video game.

The network may be a peer-to-peer type network.

The method may comprise: receiving a data signal from a central server uniquely identifying said first entertainment apparatus and at least one other entertainment device, and, in response to said data signal, sending a control signal to said first entertainment apparatus and said each other entertainment device defining a portion of said preview version of the video game to be transferred therefrom.

The method may comprise: allocating a predetermined amount of non-volatile memory space to said preview version of the video game; receiving data indicating the size of said preview version of the video game; and comparing the size of the preview version of said video game with said pre-determined amount of non-volatile memory, whereby the transfer of said preview version of the video game will take place only in the event that the size of said preview version of the video game is smaller than the predetermined amount of non-volatile memory.

The preview version of the video game may be stored in a directory that is exclusively used for distribution of material over said network.

According to another aspect of the present invention, there is provided a method of transferring a preview version of material from a first entertainment apparatus to a second entertainment apparatus, whereby, in said first entertainment apparatus, said method comprises the steps of:

extracting said preview material from a package containing both a full version of the material and said preview version of the material, said preview version being an illustration of said full version of the material; and uploading at least part of said preview material to said second apparatus over a network; and in said second entertainment apparatus, said method comprises the steps of: downloading, from said first entertainment apparatus over a network, at least part of said preview version of said material, the preview version being an illustration of a full version of the material; and storing the received preview version of said material in non-volatile memory.

Before said preview version of the material is transferred to the second entertainment apparatus, the method in the second apparatus may comprise the steps of: receiving a test signal from the first entertainment apparatus; sending a positive response to the test signal to the first entertainment apparatus; and receiving the preview version of the material in response to the positive response.

The test signal from said first apparatus may include a wake up over internet signal and an identifier that uniquely identifies said first apparatus, said method may further comprise: reviewing user preferences stored in said non-volatile memory, and where said user preferences indicate that preview versions of material are automatically allowed from the identified said first apparatus, sending said positive response.

According to another aspect of the present invention, there is provided a storage medium product containing computer readable instructions which, upon loading onto a computer, configure said computer to perform the method of: extracting preview version of material from a package containing both a full version of the material and said preview version of the material, said preview version of the material being an illustration of said full version of the material; and uploading at least part of said preview version of the material to a second apparatus over a network.

According to another aspect of the present invention, there is provided a storage medium product containing computer readable instructions which, upon loading onto a computer, configure said computer to perform the method of: downloading, from a first entertainment apparatus over a network, at least part of said preview version of a video game, said preview version being an illustration of a full version of the video game; and storing the received preview version in non-volatile memory, wherein before said preview version of the video game is transferred, the method comprises the steps of: receiving a test signal from the first apparatus; sending a positive response to the test signal to the first apparatus; and receiving the preview version of the material in response to the positive response and said test signal from said first apparatus includes a wake up over internet signal and an identifier that uniquely identifies said first apparatus, said method further comprising: reviewing user preferences stored in said non-volatile memory, and where said user preferences indicate that preview versions of video games are automatically allowed from the identified said first entertainment apparatus, sending said positive response.

According to another aspect of the present invention, there is provided a computer readable storage medium configured to store a computer readable media package, the media package containing a full version of material and a preview version of said material, said preview version of the material being an illustration of said full version of the material.

According to another aspect of the present invention, there is provided a computer readable storage medium configured to store a computer readable media package, the media package containing a full version of a video game and a preview version of said video game, said preview version of the video game being an illustration of said full version of the video game.

According to another aspect of the present invention, there is provided an entertainment apparatus, comprising: a network interface operable to be connected to a network, an extractor operable to extract a preview version of material from a package containing both a full version of material and said preview version of the material, said preview version of the material being an illustration of said full version of the material; and a processor operable to upload at least part of said preview material to a second entertainment apparatus over a network using said network interface.

The network interface may be connectable to a peer-to-peer type network.

The entertainment apparatus may comprise a storage medium operable to store locally said preview version of the material, and the processor is operable to push at least part of said stored preview material to said second entertainment apparatus over the network using said network interface.

The storage medium may be operable to store said preview material in a directory that is exclusively used for distribution of material over the network.

The processor may be operable such that before said preview material is uploaded to said second entertainment apparatus, the processor transfers a test signal to said second entertainment apparatus over the network; and uploads said preview material in response to receiving, from said second entertainment apparatus, a positive response to said test signal.

The test signal may comprise a wake-up over Internet signal.

The processor may be operable to send, via said network, an identification signal identifying said second entertainment apparatus to a server, and receive from said second entertainment apparatus a control signal, whereby said at least part of said preview version of the material is uploaded to the second entertainment apparatus in dependence on said control signal.

The material may be a video game.

According to another aspect of the present invention, there is provided an entertainment apparatus comprising a network interface operable to be connected to a network, non-volatile memory and a processor operable to: download from a different entertainment apparatus over said network, at least part of a preview version of a video game, said preview version being an illustration of a full version of the video game; store the received preview version in said non-volatile memory wherein before said preview version is transferred the processor is operable to: receive a test signal from said different entertainment apparatus; send a positive response to the test signal to said different entertainment apparatus; and receive said preview version of the material in response to the positive response and said test signal from said different entertainment apparatus includes a wake up over internet signal and an identifier that uniquely identifies said different entertainment apparatus, said processor being operable to review user preferences stored in said non-volatile memory, and where said user preferences indicate that preview versions of video games are automatically allowed from the identified said different apparatus, to send said positive response using said network interface.

The network may be a peer-to-peer type network.

The network interface may be operable to receive a data signal from a central server uniquely identifying said different entertainment apparatus and at least one other entertainment device, and, in response to said data signal, said processor is operable to send a control signal to said different entertainment apparatus and said each other entertainment device defining a portion of said preview version of the video game to be transferred therefrom.

The processor may be operable to allocate a predetermined amount of non-volatile memory space to said preview version of the video game; receive, using the network interface, data indicating the size of said preview version of the video game; and compare the size of the preview version of said video game with said pre-determined amount of non-volatile memory, whereby the transfer of said preview version of the video game will take place only in the event that the size of said preview version of the video game is smaller than the predetermined amount of non-volatile memory.

The non-volatile storage medium may be arranged such that said preview material is stored in a directory that is exclusively used for distribution of material over said network.

BRIEF DESCRIPTION OF THE DRAWINGS

The above and other aims features and advantages of the invention will be apparent from the following detailed description of illustrative embodiments which is to be read in connection with the accompanying drawings, in which.

DESCRIPTION OF THE PREFERRED EMBODIMENTS

Figure 1:
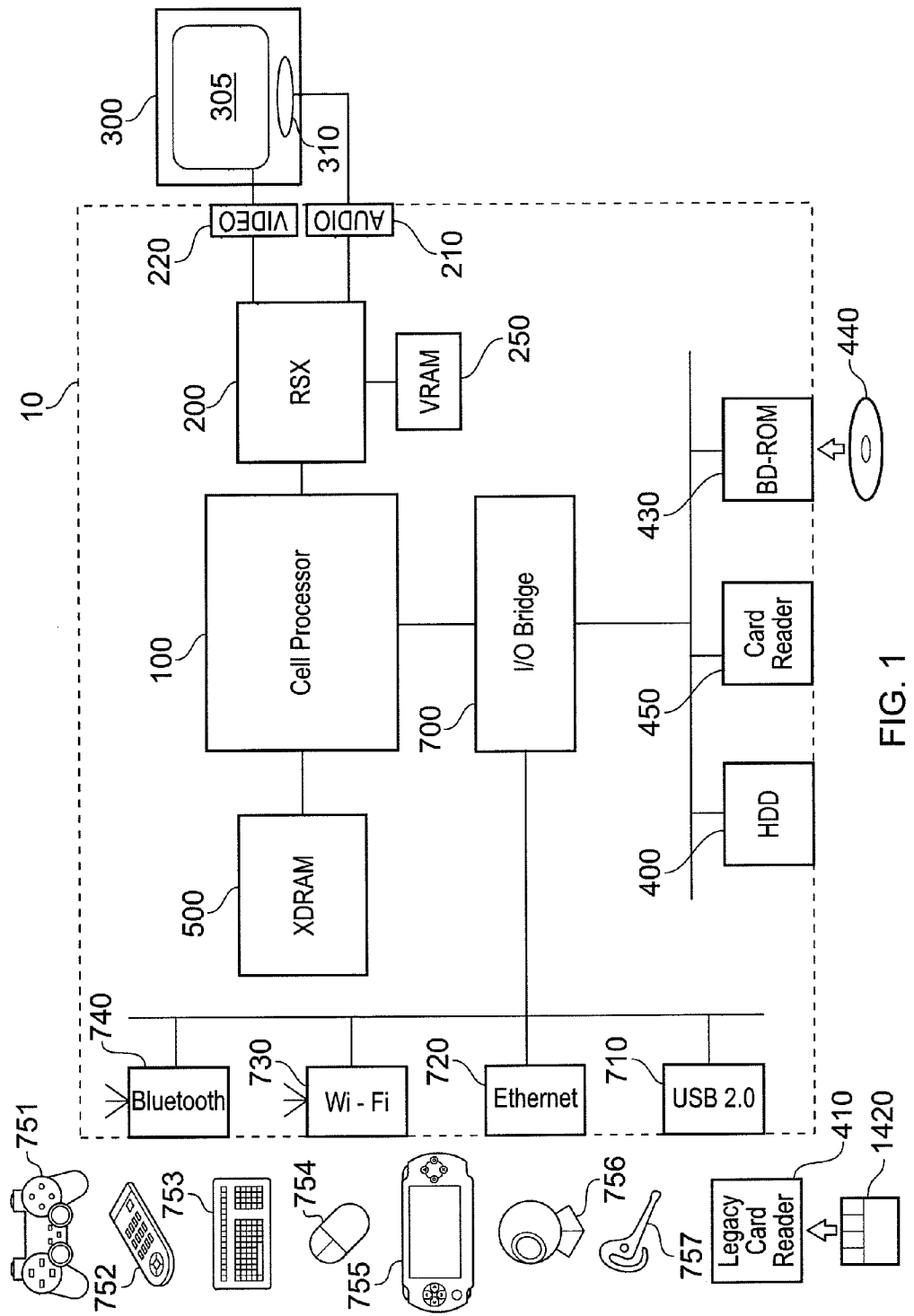
FIG. 1 shows an entertainment apparatus according to an embodiment of the present invention.

FIG. 1 schematically illustrates the overall system architecture of the Sony® Playstation 3® entertainment device. A system unit 10 is provided, with various peripheral devices connectable to the system unit.

The system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi) port 730; and a Bluetooth® wireless link port 740 capable of supporting up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a portable entertainment device 755 such as a Sony Playstation Portable® entertainment device; a video camera such as an EyeToy® video camera 756; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

The game controller 751 is operable to communicate wirelessly with the system unit 10 via the Bluetooth link. However, the game controller 751 can instead be connected to a USB port, thereby also providing power by which to charge the battery of the game controller 751. In addition to one or more analogue joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation Portable device may be used as a controller. In the case of the Playstation Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio CDs. The reader 430 is also operable to read DVD-ROMs compatible with the Playstation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

In the present embodiment, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here.

Figure 2:
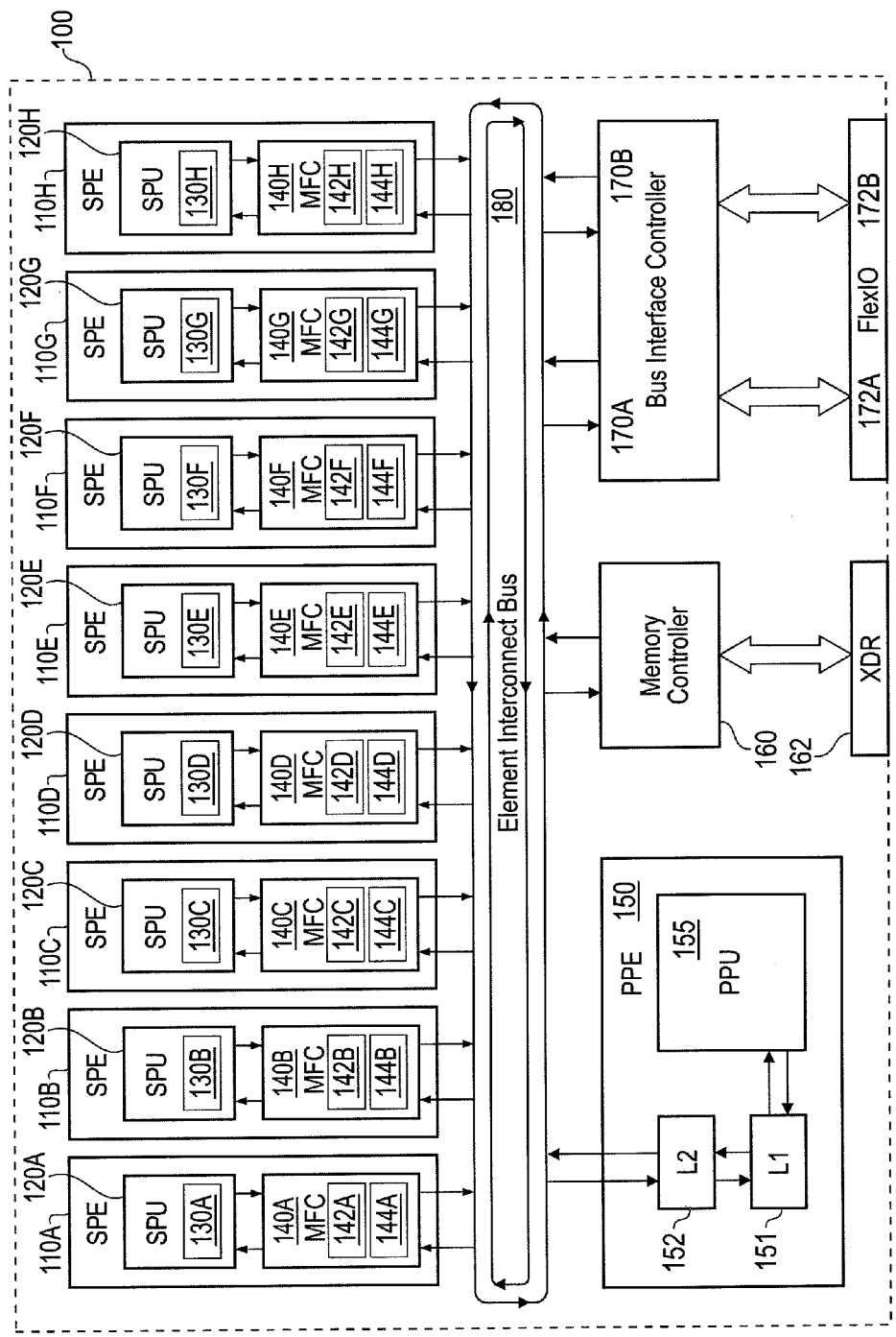
FIG. 2 shows a processor situated in the entertainment apparatus of FIG. 1.

Referring now to FIG. 2, the Cell processor 100 has an architecture comprising four basic components: external input and output structures comprising a memory controller 160 and a dual bus interface controller 170A,B; a main processor referred to as the Power Processing Element 150; eight co-processors referred to as Synergistic Processing Elements (SPEs) 110A-H; and a circular data bus connecting the above components referred to as the Element Interconnect Bus 180. The total floating point performance of the Cell processor is 218 GFLOPS, compared with the 6.2 GFLOPs of the Playstation 2 device's Emotion Engine.

The Power Processing Element (PPE) 150 is based upon a two-way simultaneous multithreading Power 970 compliant PowerPC core (PPU) 155 running with an internal clock of 3.2 GHz. It comprises a 512 kB level 2 (L2) cache and a 32 kB level 1 (L1) cache. The PPE 150 is capable of eight single position operations per clock cycle, translating to 25.6 GFLOPs at 3.2 GHz. The primary role of the PPE 150 is to act as a controller for the Synergistic Processing Elements 110A-H, which handle most of the computational workload. In operation the PPE 150 maintains a job queue, scheduling jobs for the Synergistic Processing Elements 110A-H and monitoring their progress. Consequently each Synergistic Processing Element 110A-H runs a kernel whose role is to fetch a job, execute it and synchronise with the PPE 150.

Each Synergistic Processing Element (SPE) 110A-H comprises a respective Synergistic Processing Unit (SPU) 120A-H, and a respective Memory Flow Controller (MFC) 140A-H comprising in turn a respective Dynamic Memory Access Controller (DMAC) 142A-H, a respective Memory Management Unit (MMU) 144A-H and a bus interface (not shown). Each SPU 120A-H is a RISC processor clocked at 3.2 GHz and comprising 256 kB local RAM 130A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 120A-H does not directly access the system memory XDRAM 500; the 64-bit addresses formed by the SPU 120A-H are passed to the MFC 140A-H which instructs its DMA controller 142A-H to access memory via the Element Interconnect Bus 180 and the memory controller 160.

The Element Interconnect Bus (EIB) 180 is a logically circular communication bus internal to the Cell processor 100 which connects the above processor elements, namely the PPE 150, the memory controller 160, the dual bus interface 170A,B and the 8 SPEs 110A-H, totaling 12 participants. Participants can simultaneously read and write to the bus at a rate of 8 bytes per clock cycle. As noted previously, each SPE 110A-H comprises a DMAC 142A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96B per clock, in the event of full utilisation through arbitration between participants. This equates to a theoretical peak bandwidth of 307.2 GB/s (gigabytes per second) at a clock rate of 3.2 GHz.

The memory controller 160 comprises an XDRAM interface 162, developed by Rambus Incorporated. The memory controller interfaces with the Rambus XDRAM 500 with a theoretical peak bandwidth of 25.6 GB/s.

The dual bus interface 170A,B comprises a Rambus FlexIO® system interface 172A,B. The interface is organised into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 100 to the Reality Simulator graphics unit 200 will typically comprise display lists, being a sequence of commands to draw vertices, apply textures to polygons, specify lighting conditions, and so on.

Figure 3:
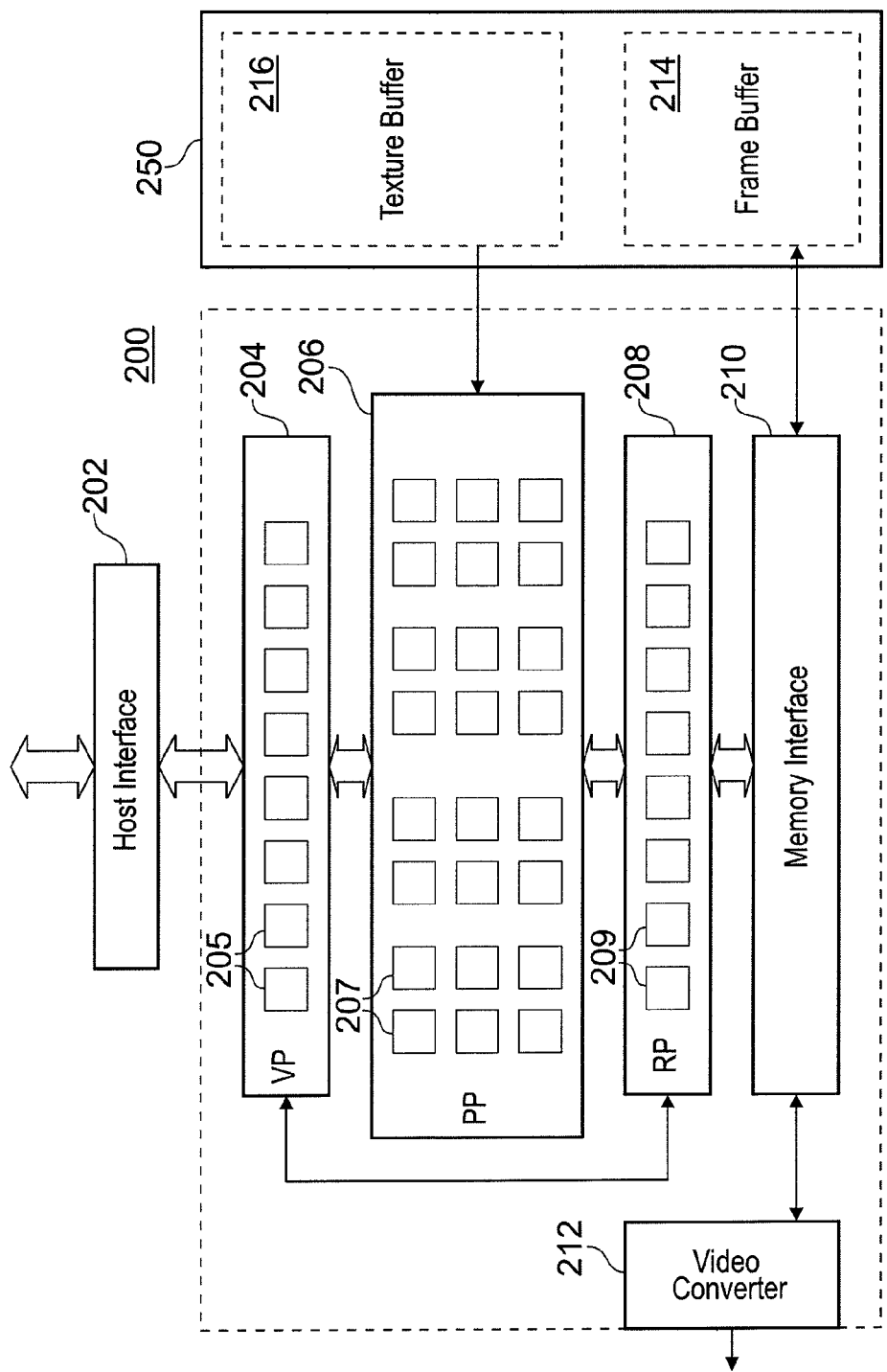
FIG. 3 shows a reality simulator graphics unit situated in the entertainment apparatus of FIG. 1.

Referring now to FIG. 3, the Reality Simulator graphics (RSX) unit 200 is a video accelerator based upon the NVidia® G70/71 architecture that processes and renders lists of commands produced by the Cell processor 100. The RSX unit 200 comprises a host interface 202 operable to communicate with the bus interface controller 170B of the Cell processor 100; a vertex pipeline 204 (VP) comprising eight vertex shaders 205; a pixel pipeline 206 (PP) comprising 24 pixel shaders 207; a render pipeline 208 (RP) comprising eight render output units (ROPs) 209; a memory interface 210; and a video converter 212 for generating a video output. The RSX 200 is complemented by 256 MB double data rate (DDR) video RAM (VRAM) 250, clocked at 600 MHz and operable to interface with the RSX 200 at a theoretical peak bandwidth of 25.6 GB/s. In operation, the VRAM 250 maintains a frame buffer 214 and a texture buffer 216. The texture buffer 216 provides textures to the pixel shaders 207, whilst the frame buffer 214 stores results of the processing pipelines. The RSX can also access the main memory 500 via the EIB 180, for example to load textures into the VRAM 250.

The vertex pipeline 204 primarily processes deformations and transformations of vertices defining polygons within the image to be rendered.

The pixel pipeline 206 primarily processes the application of colour, textures and lighting to these polygons, including any pixel transparency, generating red, green, blue and alpha (transparency) values for each processed pixel. Texture mapping may simply apply a graphic image to a surface, or may include bump-mapping (in which the notional direction of a surface is perturbed in accordance with texture values to create highlights and shade in the lighting model) or displacement mapping (in which the applied texture additionally perturbs vertex positions to generate a deformed surface consistent with the texture).

The render pipeline 208 performs depth comparisons between pixels to determine which should be rendered in the final image. Optionally, if the intervening pixel process will not affect depth values (for example in the absence of transparency or displacement mapping) then the render pipeline and vertex pipeline 204 can communicate depth information between them, thereby enabling the removal of occluded elements prior to pixel processing, and so improving overall rendering efficiency. In addition, the render pipeline 208 also applies subsequent effects such as full-screen anti-aliasing over the resulting image.

Both the vertex shaders 205 and pixel shaders 207 are based on the shader model 3.0 standard. Up to 136 shader operations can be performed per clock cycle, with the combined pipeline therefore capable of 74.8 billion shader operations per second, outputting up to 840 million vertices and 10 billion pixels per second. The total floating point performance of the RSX 200 is 1.8 TFLOPS.

Typically, the RSX 200 operates in close collaboration with the Cell processor 100; for example, when displaying an explosion, or weather effects such as rain or snow, a large number of particles must be tracked, updated and rendered within the scene. In this case, the PPU 155 of the Cell processor may schedule one or more SPEs 110A-H to compute the trajectories of respective batches of particles. Meanwhile, the RSX 200 accesses any texture data (e.g. snowflakes) not currently held in the video RAM 250 from the main system memory 500 via the element interconnect bus 180, the memory controller 160 and a bus interface controller 170B. The or each SPE 110A-H outputs its computed particle properties (typically coordinates and normals, indicating position and attitude) directly to the video RAM 250; the DMA controller 142A-H of the or each SPE 110A-H addresses the video RAM 250 via the bus interface controller 170B. Thus in effect the assigned SPEs become part of the video processing pipeline for the duration of the task.

In general, the PPU 155 can assign tasks in this fashion to six of the eight SPEs available; one SPE is reserved for the operating system, whilst one SPE is effectively disabled. The disabling of one SPE provides a greater level of tolerance during fabrication of the Cell processor, as it allows for one SPE to fail the fabrication process. Alternatively if all eight SPEs are functional, then the eighth SPE provides scope for redundancy in the event of subsequent failure by one of the other SPEs during the life of the Cell processor.

The PPU 155 can assign tasks to SPEs in several ways. For example, SPEs may be chained together to handle each step in a complex operation, such as accessing a DVD, video and audio decoding, and error masking, with each step being assigned to a separate SPE. Alternatively or in addition, two or more SPEs may be assigned to operate on input data in parallel, as in the particle animation example above.

Software instructions implemented by the Cell processor 100 and/or the RSX 200 may be supplied at manufacture and stored on the HDD 400, and/or may be supplied on a data carrier or storage medium such as an optical disk or solid state memory, or via a transmission medium such as a wired or wireless network or internet connection, or via combinations of these.

The software supplied at manufacture comprises system firmware and the Playstation 3 device's operating system (OS). In operation, the OS provides a user interface enabling a user to select from a variety of functions, including playing a game, listening to music, viewing photographs, or viewing a video. The interface takes the form of a so-called cross media-bar (XMB), with categories of function arranged horizontally. The user navigates by moving through the function icons (representing the functions) horizontally using the game controller 751, remote control 752 or other suitable control device so as to highlight a desired function icon, at which point options pertaining to that function appear as a vertically scrollable list of option icons centred on that function icon, which may be navigated in analogous fashion. However, if a game, audio or movie disk 440 is inserted into the BD-ROM optical disk reader 430, the Playstation 3 device may select appropriate options automatically (for example, by commencing the game), or may provide relevant options (for example, to select between playing an audio disk or compressing its content to the HDD 400).

In addition, the OS provides an on-line capability, including a web browser, an interface with an on-line store from which additional game content, demonstration games (demos) and other media may be downloaded, and a friends management capability, providing on-line communication with other Playstation 3 device users nominated by the user of the current device; for example, by text, audio or video depending on the peripheral devices available. The on-line capability also provides for on-line communication, content download and content purchase during play of a suitably configured game, and for updating the firmware and OS of the Playstation 3 device itself. It will be appreciated that the term "on-line" does not imply the physical presence of wires, as the term can also apply to wireless connections of various types.

Figure 4:
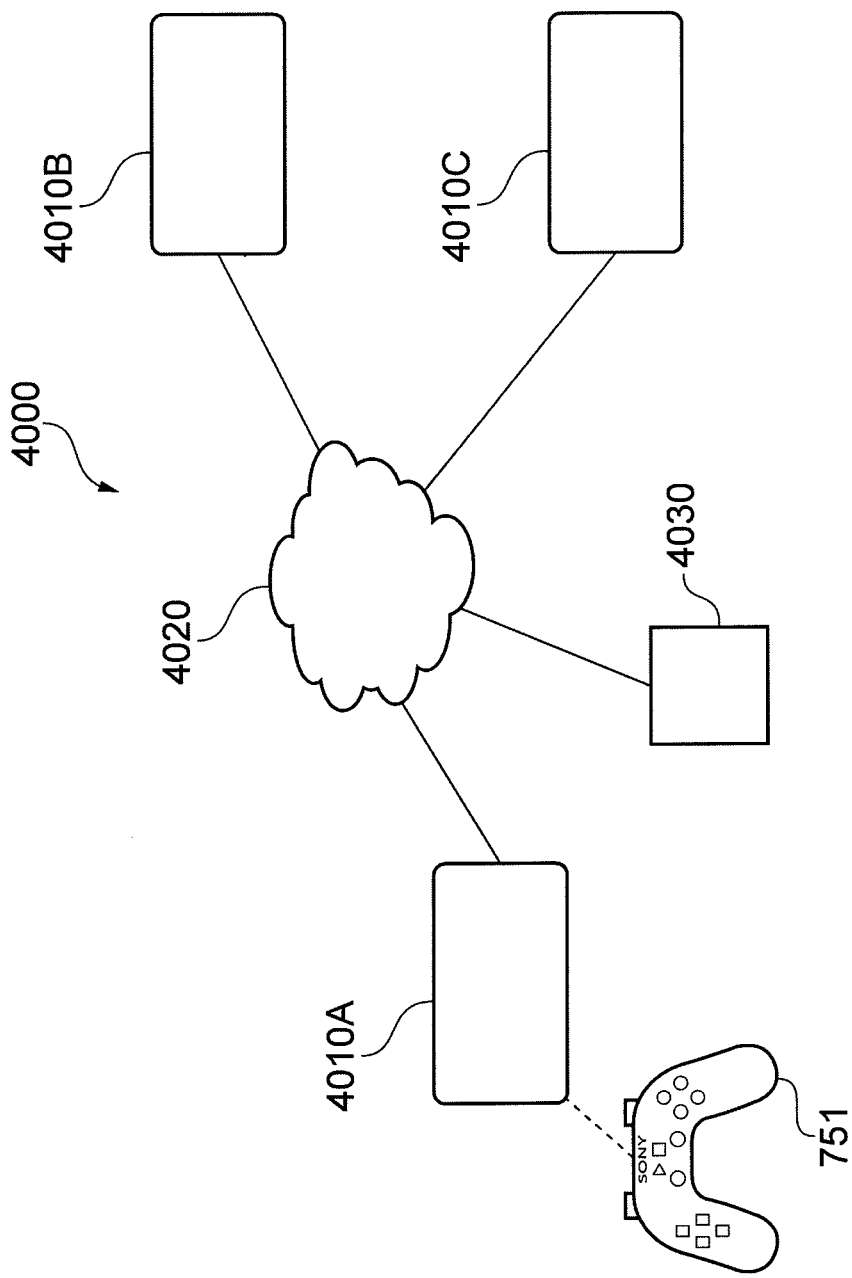
FIG. 4 shows a network of entertainment systems according to an embodiment of the present invention.

Referring to FIG. 4, a system 4000 comprising a number of entertainment apparatuses 4010A-C connected together by a network 4020 is shown. Each of the entertainment apparatuses 4010A-C is controlled by handheld controllers 751, although for illustrative purposes, a single controller 715 controlling a first entertainment apparatus 4010A is shown in the Figure. As will be appreciated, the network 4020 can be a Local Area Network (LAN), Wide Area Network (WAN), the Internet or an Ad-Hoc Network. In the following description however, the network 4020 is a peer-to-peer (P2P) type network implemented over the Internet. As one skilled in the art will appreciate, a P2P network is a networking method whereby participants share a portion of their own resources, such as processing power, disk storage, network bandwidth, printing facilities. Such resources are provided directly to other participants without intermediary network hosts or servers. In the P2P network of the present embodiment, computer files containing demonstration versions of video games are distributed as will be explained later.

Figure 5:
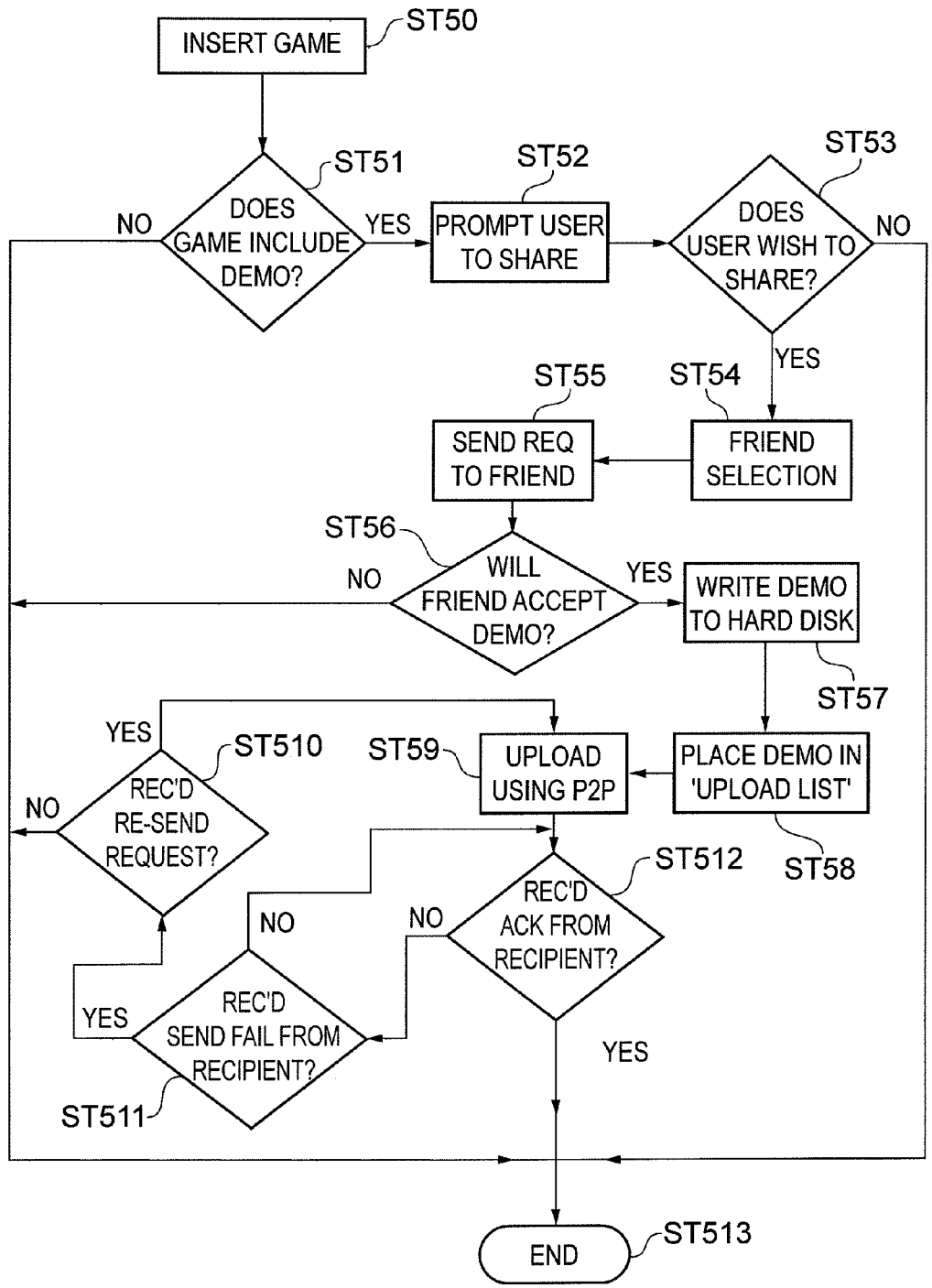
FIG. 5 shows a flow diagram describing an embodiment of the invention at the sender side.

Referring to FIG. 5, a flow diagram explaining embodiments at the side sending the demonstration version of the video game will be explained. A user of the first entertainment apparatus 4010A inserts a video game into the reader 430 (step ST50). This video game is stored on a Blu-Ray disc. On the video game disc is stored the complete video game and a demonstration version of the same video game. The demonstration version of the video game may provide a small segment of the video game (for example, one level in a platform game or one racing circuit in a driving game) or may provide reduced functionality (for example no save game facility, no co-op mode or the like) or any combination thereof. Indeed, the demonstration version of the video game may include a visible watermark, or other Digital Rights Management which would impair the demonstration version of the game. In other words, the demonstration of the video game provides a preview of the full version of the video game in order to persuade the user to purchase the full version of the game. The demonstration version and the full version of the game contain different eboot directories, although each are signed by Sony and are encrypted. This ensures the integrity of the demonstration version of the video game. The video game disc may also contain other metadata relating to the game or the game's producers. Metadata is a term of art and is data describing other data and is usually smaller than the data it is describing.

The first entertainment apparatus 4010A verifies that the game disc includes both the complete video game and the demonstration version of the same video game (step ST51).

If the result of this comparison is negative, the video game will be played as normal, or in other words, the user will simply play the full version of the game. However, if the game disc does also include the demonstration version of the same game, the user will be prompted by an on-screen message whether or not they wish to share the demonstration version of the game with another user (step ST52). The response is received in step ST53. If the user does not wish to share the demonstration version of the game, they will be allowed to continue playing the full version of the video game and so this procedure will end.

However, if the user does wish for the demonstration version of the game to be shared, the user will be prompted to select a user with which to share the demonstration version of the game (step ST54). This other user may be a friend of the user or may be a different contact with whom the user has previously played. As the user has previous knowledge of the other user, the user may know of the types of games that would interest the other user. This means that the demonstration versions of the games will be targeted to consumers who would appreciate the game and would be more inclined to purchase a game of that type.

After the user has selected the other user, or other users, to which the demonstration version of the video game is to be sent, the first entertainment unit 4010A sends a request to the other friend or friends (step ST55). The request is sent to the other user or users over the network 4020. In the following, it is assumed that only one friend is selected and that they are using a second entertainment apparatus 4010B. This is for illustrative purposes only and in reality any number of other friends can be selected.

The second entertainment apparatus 4010B receives this request. If the second entertainment apparatuses 4010B is shut down (i.e. Sleeping, Hibernating or Soft Off, i.e. Advanced Configuration and Power Interface (ACPI) state G1 or G2), then a so-called known "Wake-On LAN" or "Wake-On Internet" procedure is activated. This enables the second entertainment apparatus 4010B to become active. Depending on the user selected options regarding whether or not the user of the second entertainment apparatus 4010B will automatically accept all demonstration versions of video games from the first entertainment apparatus 4010A (see later for explanation), a positive response may be automatically sent back to the first entertainment apparatus 4010A. Alternatively, if the other user is playing a video game or movie on the second entertainment apparatus 4010B, then they will be prompted for a response. The response is sent back to the first entertainment apparatus 4010A. This is received at the first entertainment apparatus 4010A (step ST56). If the other user does not wish to receive the demonstration version of the video game, the procedure will end. Additionally, if the other user is below the classification age of the video game (which is known from their profile stored locally within the second entertainment apparatus 4010B), then an automatically generated declination response is sent to the first entertainment apparatus 4010A.

However, if the other user does wish to receive the demonstration version of the video game, the first entertainment unit 4010A copies the demonstration version of the video game to the HDD 400. In particular, the demonstration version of the video game is copied to a part of the HDD 400 that is partitioned from the system files. In other words, the demonstration version of the video game is written to a part of the HDD 400 that contains only files that can be shared over the network 4020. This protects the system files from unauthorised access over the network 4020 and possible corruption by scurrilous third parties. It should be noted here that the computer code required to perform the transfer on all the entertainment apparatuses in the network is written into the system files of each entertainment apparatus. This allows the transfer to take place in the background. In other words, by placing the computer code required to perform the transfer in the system files, the user can perform other tasks, such as game playing, watching a movie etc whilst the transfer takes place.

The reason that the demonstration version of the video game is copied to the HDD 400 is so that the game disc can be removed from the reader 430 of the first entertainment apparatus 4010A allowing the demonstration version of the video game to be uploaded to the second entertainment apparatus 4010B in the background whilst the user of the first entertainment apparatus 4010A plays a different game, surfs the Internet, visits the PlayStation Store or watches a Blu-Ray movie. This provides flexibility to the user allowing the distribution of the demonstration of the video game without being hindered. Moreover, by only storing the demonstration version of the video game only after the other user has indicated that they wish to receive the demonstration version, the storage space on the HDD 400 is efficiently used.

A message identifying the user and the first entertainment apparatus 4010A is sent to a central server 4030. The central server 4030 stores information identifying which demonstration versions of video games are stored on various machines. This information is used when uploading the demonstration version to the other user as will be explained later. The demonstration version of the video game is placed in an "upload" queue (step ST59). The position of the demonstration version of the game in queue is dependent upon a number of factors. For example, it can be placed at the bottom of the queue (i.e. on a first come-first served basis), or be given a user defined higher priority. Alternatively, the uploading of the demonstration version of the video game can be given any type of priority level.

In order to upload the demonstration to the other user or users, it is preferable that a P2P type transfer is used. This method of transfer is particularly suited to this scenario and reduces the time taken to transfer the demonstration version of the video game. This is because often broadband providers are asymmetric meaning that the upload speed over a network is far lower than the download speed. Therefore, by implementing embodiments of this invention in a P2P manner means that many devices upload small amounts of different pieces of the demonstration version of the video game (thus utilising the lower upload speed) whilst the recipient utilises the higher download speed by simultaneously obtaining the different pieces from the different devices.

When the demonstration version of the video game reaches the top of the queue, the user entertainment apparatus sends data to the central server 4030 identifying the other user and the game which is to be uploaded to the second entertainment apparatus 4010B. The central server 4030 searches the database contained therein to identify other entertainment apparatuses that contain the demonstration version of the video game and that are switched on, logged onto the central server 4030 and are in the appropriate geographical area to the second entertainment apparatus 4010B. The other entertainment apparatuses that are identified may be only friends of the other user or may be any user known or unknown to the other user. One such other entertainment apparatus is a third entertainment apparatus 4010C.

The information derived from the database of the central server 4030 is passed to the second entertainment apparatus 4010B (i.e. the entertainment unit to which the demonstration of the video game is to be uploaded). Upon receipt of this information, the second entertainment apparatus 4010B prepares to commence receipt of the demonstration version of the video game. This may include waking-up if in hibernation. The second entertainment apparatus 4010B then coordinates the transfer of the demonstration of the video game in a P2P manner by interacting with, in this case, the first and third entertainment apparatuses which contain the demonstration version of the video game. Although it is noted that the central server 4030 informs the second entertainment apparatus 4010B that transfer is about to commence, it is noted that the first entertainment apparatus 4010A may inform the second entertainment apparatus 4010B directly.

As would be understood by the skilled person, because the second entertainment apparatus 4010B is coordinating the P2P transfer, this can be managed efficiently. This is because the second entertainment apparatus 4010B coordinates which piece of the demonstration version of the video game should be obtained from which of the first and third entertainment apparatus 4010A, 4010C. Further, if the transfer is to be paused, the second entertainment apparatus 4010B informs the first and third entertainment apparatus 4010A, 4010C by sending a message thereto. The resumption of the transfer will then take place after a predetermined time, or following a further signal from the second entertainment apparatus 4010B.

If one of the first or third entertainment apparatus 4010A, 4010C either loses the connection or is switched off, then the second entertainment apparatus 4010B will simply request that the piece of the demonstration version of the video game which was being obtained from the entertainment apparatus whose connection was lost is obtained from the other entertainment apparatus.

After the demonstration version of the video game has been downloaded successfully onto the second entertainment apparatus 4010B, a positive acknowledgement is sent to each of the first and third entertainment apparatuses 4010A and 4010C, as well as to the central server 4030 (the "yes" path at step ST512). If the positive acknowledgement was not received (the "no" path at step ST512) at either of the first or third entertainment apparatuses (the "no" path at step ST511), the first or third entertainment apparatuses 4010A, 4010C will wait until they receive an acknowledgment or until they time-out.

After receipt of this positive acknowledgment, the entertainment apparatuses will disconnect from one another and the central server 4030 will update the database indicating that the second entertainment apparatus 4010B now includes the demonstration version of the video game. This means that the second entertainment apparatus 4010B can be accessed by other entertainment apparatuses which require the demonstration version of the video game in the future. In other words, the second entertainment apparatus 4010B will become part of the P2P network when other entertainment apparatuses download the demonstration version of the video game. As far as the first entertainment apparatus 4010A is concerned, the transfer is complete (step ST513). A message is displayed to the user of the first entertainment apparatus 4010A indicating that the transfer was successfully completed.

If the demonstration version of the video game was not downloaded successfully onto the second entertainment apparatus 4010B, a negative acknowledgement is sent to each of the first and third entertainment apparatuses (the "yes" path on step ST511). If a negative acknowledgement is received, then the first and third entertainment apparatuses 4010A, 4010C will wait for a request to re-send the relevant piece of the demonstration version of the video game. If the request to re-send is not received within a predetermined period, or the request for re-send is negative, then the procedure ends (the "no" path in step ST510). An on-screen message is displayed to the user of the first entertainment apparatus 4010A informing the user that the transfer has failed and the three entertainment apparatuses 4010A-C disconnect from one another.

Alternatively, if the second entertainment apparatus 4010B does wish for the demonstration version of the video game to be re-sent (the "yes" path at step ST510), then the demonstration version of the video game is uploaded again using P2P (see step ST59).

Figure 6:
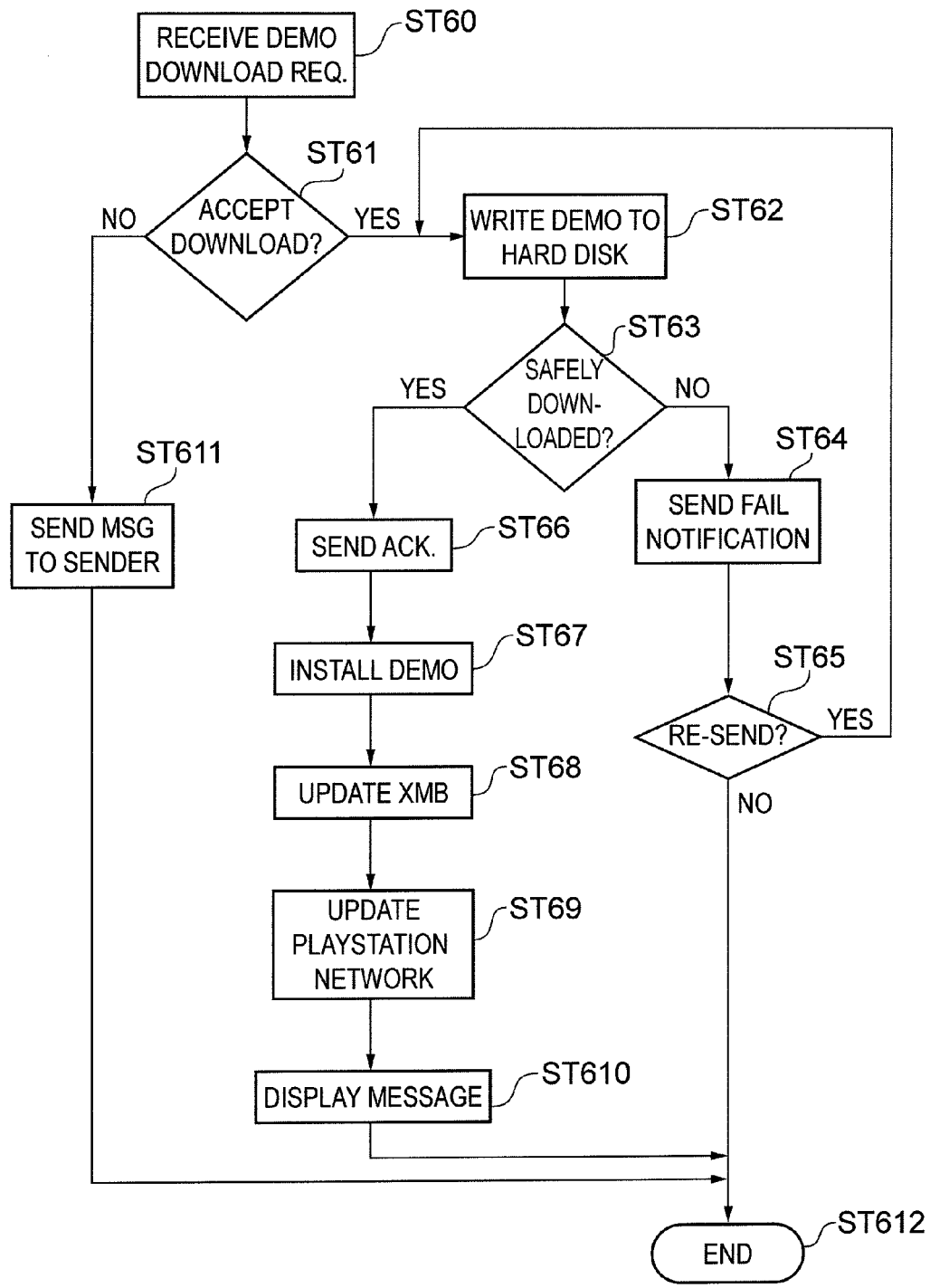
FIG. 6 shows a flow diagram describing an embodiment of the invention at the receiver side.

Referring to FIG. 6, the procedure at the second entertainment apparatus 4010B is now described. The second entertainment apparatus 4010B receives the request to upload the demonstration version of the video game from the first entertainment apparatus 4010A (step ST60). In this request, the size of the demonstration version of the video game is provided and this is displayed to the user of the second entertainment apparatus 4010B. The user is prompted to either accept or decline the demonstration version of the video game (step ST61). If the user of the second entertainment apparatus 4010B declines the upload (the "no" path from step ST61), a message is sent to the first entertainment apparatus (step ST611) indicating that the second entertainment apparatus 4010B does not wish receive demonstration version of the video game.

Additionally, if the available or allocated size of the hard disk in the second entertainment apparatus 4010B is smaller than the size of the demonstration version of the video game, the decline message is automatically sent. The amount of hard disk space allocated for content transferred using P2P is determined by the user and can be changed at any time.

The second entertainment apparatus 4010B checks whether the demonstration version of the video game has already been installed therein. If it has, to ensure that a further copy is not stored, and to not inconvenience the user of the second entertainment apparatus 4010B, the decline message is automatically sent.

The sending of the decline message will be displayed to the user of the second entertainment apparatus 4010B. The procedure will end (step ST612).

If the user of the second entertainment apparatus 4010B does wish to download the demonstration version of the video game (the "yes" path in step ST61), then the central server 4030 sends the information identifying the other devices that contain the demonstration of the video game (in this case the first and third entertainment apparatuses 4010A, 4010C). Additionally, the user of the second entertainment apparatus 4010B will be presented with the option of always accepting all demonstrations of video games (i.e. don't ask again), always accept from this friend (i.e. don't ask for this user/entertainment apparatus, but ask for every other user), or always ask. This information is stored locally on the hard disk of the second apparatus 4010B and implemented on future downloads. Indeed, if the user of the second entertainment apparatus 4010B has indicated that he or she either always accepts demonstrations of video games, or that they always accept demonstrations from this user, then the downloading will commence. Moreover, if the second entertainment apparatus 4010B receives a "wake up on LAN" or "wake up on Internet" signal, and the user always accepts all demonstrations or demonstrations from this friend, then the second entertainment apparatus 4010B will wake up from standby and will automatically accept the download without interrupting the user. This allows efficient transfer of the demonstration of the video game.

The second entertainment apparatus 4010B co-ordinates the downloading of the demonstration version of the video game in a P2P manner as noted hereinbefore. The demonstration version of the video game is written to the directory of the hard disk of the second entertainment apparatus reserved for content transferred using P2P (step ST62).

The second entertainment apparatus 4010B checks to see if the demonstration version of the video game has been successfully downloaded (step ST63). If the demonstration version of the video game was not safely downloaded the sending failed notification is sent to the first and third entertainment apparatuses 4010A, 4010C (step ST64). The user of the second entertainment apparatus 4010B is prompted to decide whether he or she wishes for the demonstration version of the video game to be downloaded again (step ST65). If the user of the second entertainment apparatus 4010B does wish for the demonstration version of the video game to be downloaded again (the "yes" path of step ST65), then the second entertainment apparatus 4010B co-ordinates with the first and third entertainment apparatuses 4010A, 4010C to arrange the transfer of the appropriate pieces of the demonstration version of the video game.

However, if the user of the second entertainment apparatus 4010B does not wish to receive the demonstration version of the video game, then a message is sent to the first and third entertainment apparatuses 4010A, 4010C and then disconnects from both of the other entertainment apparatuses and the procedure ends (step ST612).

If the demonstration version of the video game was successfully downloaded (the "yes" path of step ST63), then the positive acknowledgement is sent to each of the first and third entertainment apparatus 4010A, 4010C and the central server 4030 (step ST66). As noted earlier, the central server 4030 updates the database indicating that the second entertainment apparatus 4010B contains the demonstration version of the video game.

The second entertainment apparatus 4010B then checks whether the downloaded demonstration version of the video game has been signed by Sony and encrypted to ensure that the downloaded demonstration version of the video game is legitimate. After legitimacy has been established, the demonstration version of the video game is installed (step ST67). The Cross Media Bar (XMB) is then updated to indicate that the demonstration version of the video game can be accessed from the hard disc drive (step ST68). A link is established in the Playstation Network giving the user the opportunity to purchase the full version of the game (step ST69). This makes it easy for the user of the second entertainment apparatus 4010B to purchase the full version of the video game should they wish. Finally, a message is displayed indicating that the demonstration version of the video game has been successfully installed and is ready to use (step ST610). The procedure then ends (step ST612).

After the demonstration of the video game has been installed on the second entertainment apparatus 4010B, the demonstration can be forwarded to other devices in a manner similar to that discussed in FIG. 5. In fact, if the user of the second entertainment apparatus 4010B does wish to share the downloaded demonstration of the video game, the sending function will start from step ST52 of FIG. 5. This provides a very efficient way of distributing the content across many devices on a network.

Figure 7A:
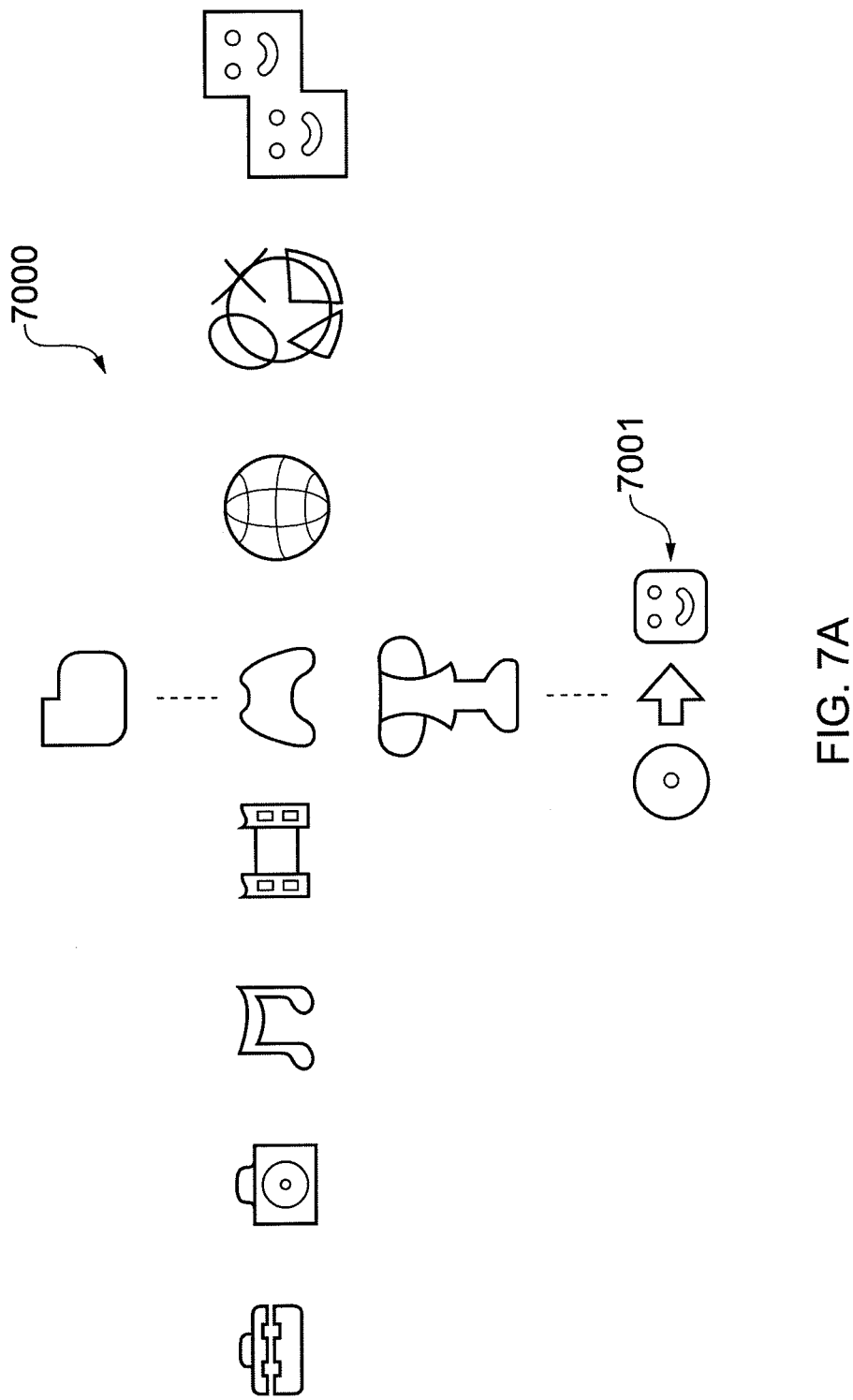
FIGS. 7A-7C show representative screenshots illustrating embodiments of the invention in the sender side.

Referring to FIG. 7A, a representative screenshot on the sender side (the first entertainment apparatus 4010A) is shown. As will be seen, the representative screenshot shows a Cross Media Bar (XMB) 7000 which is the graphical user interface used on the Playstation 3. The interface features icons that are spread horizontally across the screen. Navigation moves the icons, instead of a cursor. These icons are used as categories to organize the options available to the user. When an icon is selected on the horizontal bar, several more appear vertically, above and below it (selectable by the up and down directions on a directional pad). As can be seen from FIG. 7A, when a video game containing both the full version of the video game and a demonstration version of the video game is inserted into the Playstation 3, icon 7001 can be accessed. As the skilled person will appreciate, many icons appear on the XMB, and for the ease of illustration, only a select number are shown.

Figure 7B:
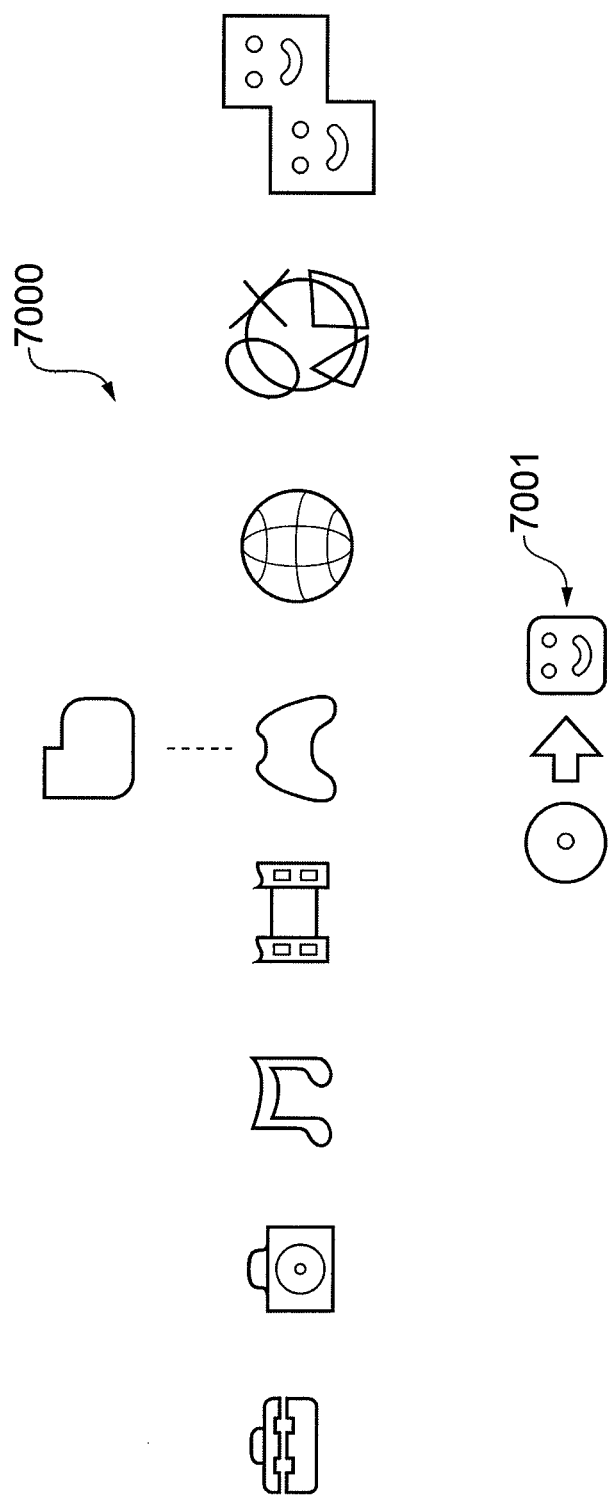
Figure 7C:
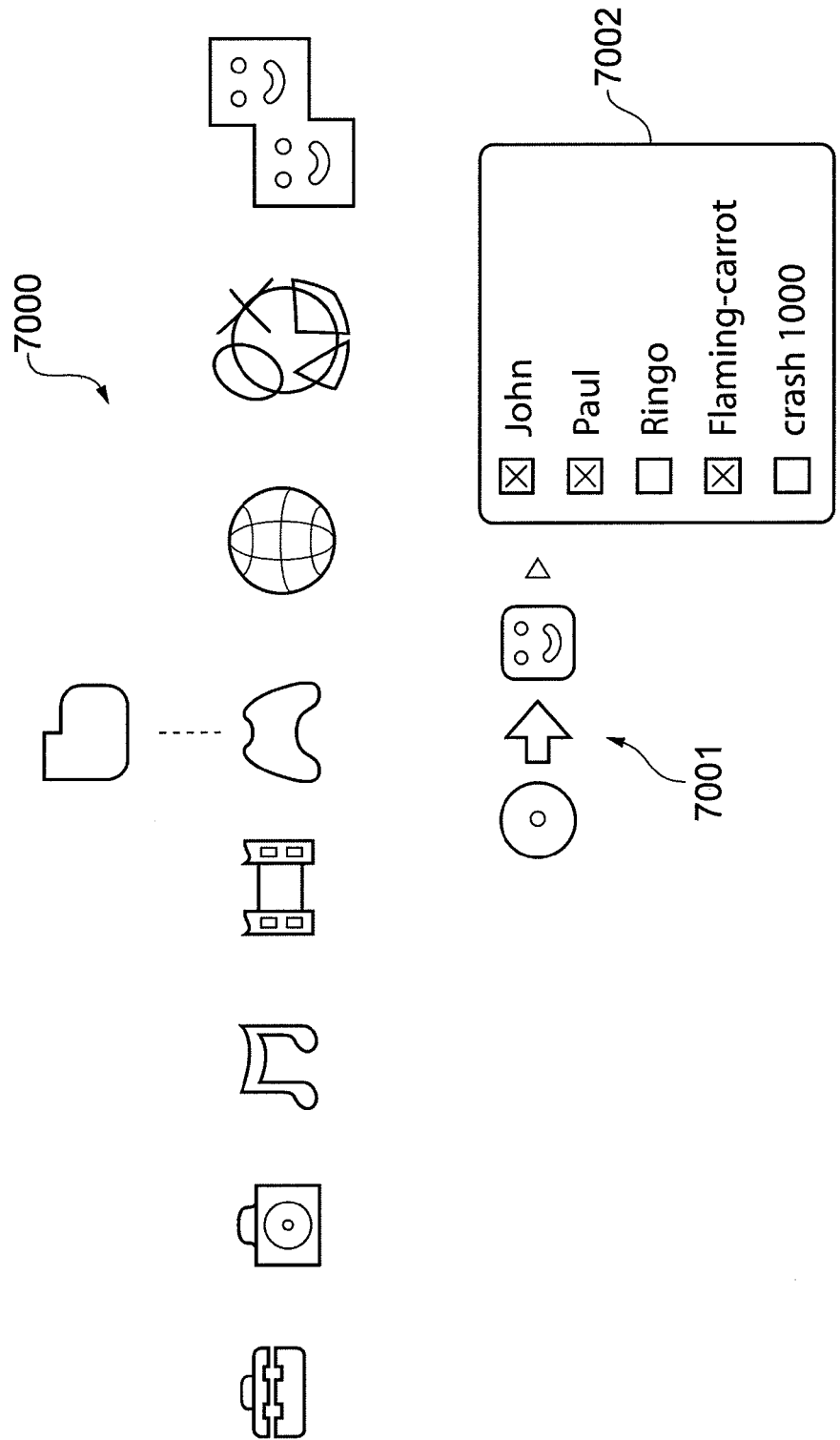

Referring to FIG. 7B, if the user wishes to transfer the demonstration version of the video game to a friend or friends, the XMB is navigated until icon 7001 is highlighted. The user selects this icon using a button on the controller 751. Referring to FIG. 7C, after selecting icon 7001, a list of friends 7002 of the user of the first entertainment apparatus 4010A is displayed. The user navigates list 7002 using the controller 751 to select the friends to whom he or she wishes the demonstration version of the video game to be sent. This is indicated in list 502 by the "X" next to the name. After all the selections have been made, the user will initiate the sending of the demonstration version of the game by pressing a different button on the controller 751, for example the "A" button.

Figure 8A:
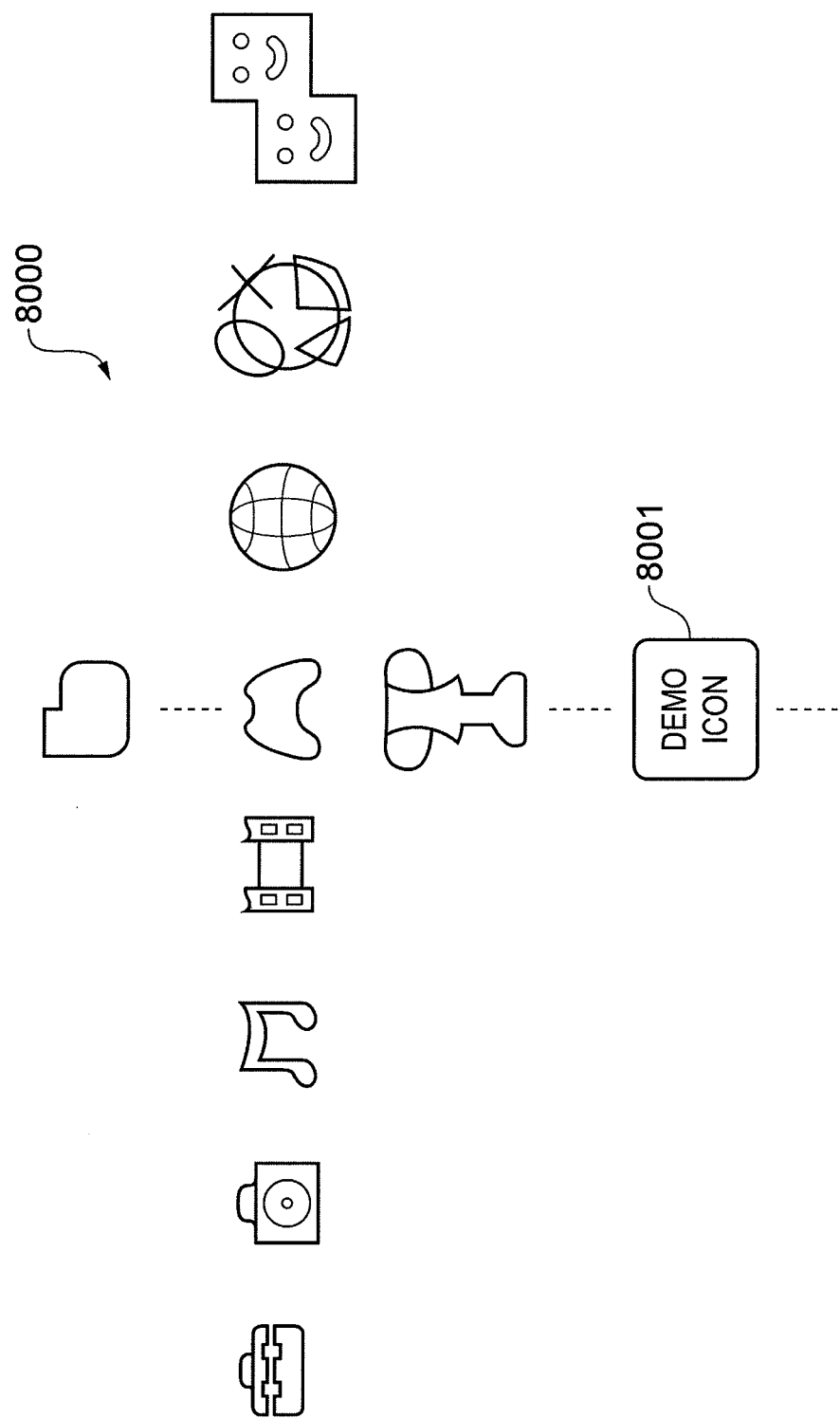
FIGS. 8A and 8B show other representative screenshots illustrating embodiments of the invention in the receiver side.
Figure 8B:
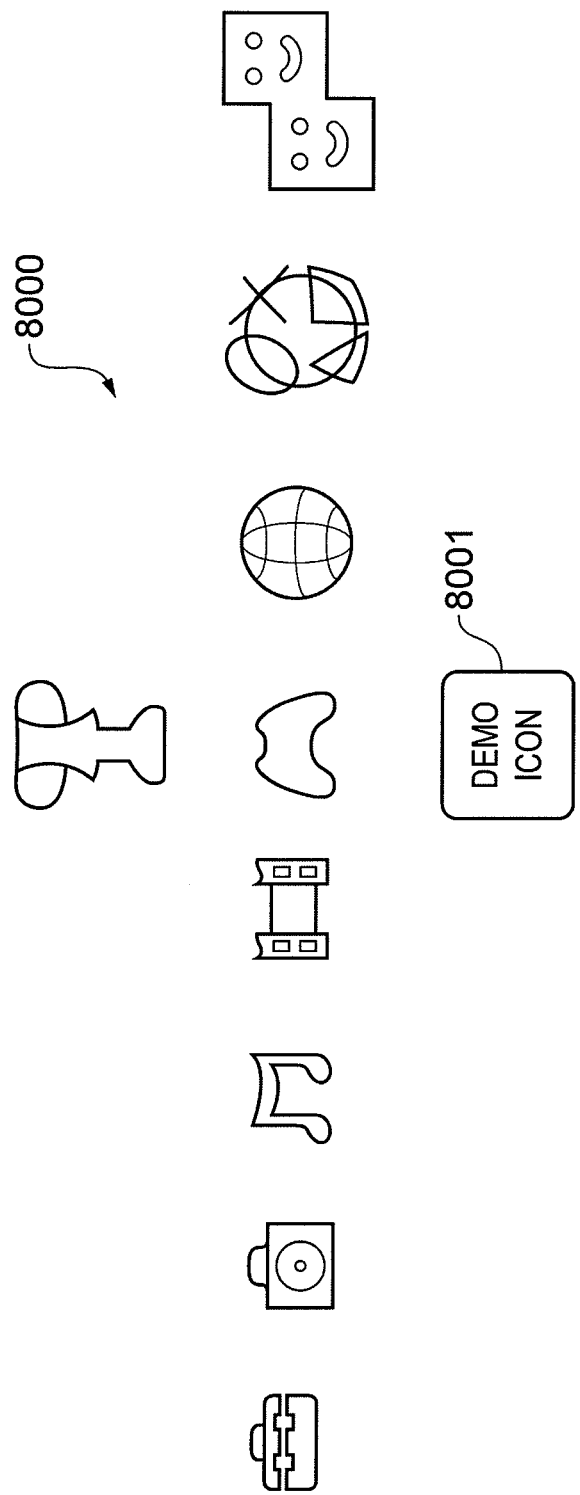

Referring to FIG. 8A, after successful installation of the demonstration version of the video game, a graphical icon 8001 representing the demonstration version of the game is added to the XMB 8000 of the recipient entertainment apparatus (i.e. the second entertainment apparatus 4010B). The graphical icon 8001 may be a still or moving image and may or may not include accompanying audio. Referring to FIG. 8B, if the user of the second entertainment apparatus 4010B wishes to play the demonstration version of the video game, then they highlight the graphical icon 8001 and select the graphical icon 8001 using the controller 751.

Although the foregoing has described the full version of the video game and the demonstration version of the video game as being provided on a game disc, the invention is not so limited. For instance, the full version of the video game and the demonstration version of the video game could be downloaded over the network 4020 or may be provided in any other manner. The full version of the video game and the demonstration version of the video game are to be provided, in embodiments, on the same "game package". In other words, they are to be bundled together when the full version of the game is purchased.

Also, although the foregoing refers to the transfer of the demonstration version of the video game being over a network using a P2P technique, the invention is not so limited. Indeed, the demonstration version of the video game can be transferred over an ad-hoc network, a client-server type network, a Bluetooth Network or any type of network.

Although the foregoing discusses the transfer of a demonstration version of a video game and a full version of a video game, the invention is not so limited. Indeed, this invention is applicable to any type of material, such as movies, software, music or the like.

Although the foregoing describes transferring a stand-alone preview version, the invention is not so limited. It is possible that references (or pointers) to other program code (rather than program code itself) could be transferred instead of, or in combination with, parts of standard program code. This would allow the recipient device to generate the preview material on the fly and may typically save storage space.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention defined by the claims.

We claim:

1. A method of transferring a preview version of a video game from a first entertainment apparatus to a second entertainment apparatus over a network, wherein, in said first entertainment apparatus, said method comprises the steps of:
    extracting said preview version of the video game from a package stored on a game disc, the package containing both a full version of the video game and said preview version of the video game, said preview version being an illustration of said full version of the video game;
    storing locally to said first entertainment apparatus said preview version of said video game in a directory that is exclusively used for distributing data over the network; and
    sending a request to transfer at least part of said preview version of the video game to said second apparatus over the network;
    wherein, in said second entertainment apparatus, said method comprises the steps of:
    receiving a request from the first entertainment apparatus to transfer at least part of said preview version of the video game to said second apparatus over the network;
    accepting or declining the request; and
    in response to the second entertainment apparatus accepting the request, the second entertainment apparatus coordinating the transfer of said at least part of said preview version of said video game from said first entertainment apparatus to said second entertainment apparatus.

2. A method of transferring according to claim 1, wherein said network is a peer-to-peer type network.

3. A method of transferring according to claim 1, wherein before said preview version of the video game is uploaded to said second entertainment apparatus, the method comprises:
    transferring a test signal to said second entertainment apparatus; and
    uploading said preview version of the video game in response to receiving, from said second apparatus, a positive response to said test signal.

4. A method of transferring according to claim 3, wherein said test signal comprises a wake-up over Internet signal.

5. A method of transferring according to claim 1, comprising sending an identification signal identifying said second entertainment apparatus to a server, and receiving from said second entertainment apparatus a control signal, whereby said at least part of said preview version of the video game is uploaded to the second entertainment apparatus in dependence on said control signal.

6. A method of transferring according to claim 1, further comprising:
    allocating a predetermined amount of non-volatile memory space to said preview version of the video game;
    receiving data indicating the size of said preview version of the video game; and
    comparing the size of the preview version of said video game with said pre-determined amount of non-volatile memory,
    whereby the transfer of said preview version of the video game will take place only in the event that the size of said preview version of the video game is smaller than the predetermined amount of non-volatile memory.

7. A non-transitory storage medium product containing computer readable instructions which, upon loading onto a computer, configure said computer to perform a method of transferring a preview version of a video game from a first entertainment apparatus to a second entertainment apparatus over a network, wherein, in said first entertainment apparatus, said method comprises the steps of:
    extracting preview version of the video game from a package stored on a game disc, the package containing both a full version of the video game and said preview version of the video game, said preview version of the video game being an illustration of said full version of the video game;
    storing locally to said first entertainment apparatus said preview version of said video game in a directory that is exclusively used for distributing data over the network; and
    sending a request to transfer at least part of said preview version of the video game to a second apparatus over the network;
    wherein, in said second entertainment apparatus, said method comprises the steps of:
    receiving a request from the first entertainment apparatus to transfer at least part of said preview version of the video game to said second apparatus over the network;
    accepting or declining the request; and
    in response to the second entertainment apparatus accepting the request, the second entertainment apparatus coordinating the transfer of said at least part of said preview version of said video game from said first entertainment apparatus to said second entertainment apparatus.

8. A non-transitory storage medium product containing computer readable instructions which, upon loading onto a computer, configure said computer to perform the method of:
    downloading, from a first entertainment apparatus over a network to a second entertainment apparatus, at least part of said preview version of a video game, said preview version being an illustration of a full version of the video game, and said preview version being stored locally by said first entertainment apparatus in a directory that is exclusively used for distribution of data over the network; and storing the received preview version in non-volatile memory of the second entertainment apparatus, wherein before said preview version of the video game is transferred, the method comprises the steps of:

receiving a test signal from the first apparatus;

sending a positive response to the test signal to the first apparatus from the second entertainment apparatus; and receiving the preview version of the video game in response to the positive response and said test signal from said first apparatus includes a wake up over Internet signal and an identifier that uniquely identifies said first apparatus, said method further comprising:

reviewing user preferences stored in said non-volatile memory, and where said user preferences indicate that preview versions of video games are automatically allowed from the identified said first entertainment apparatus, sending said positive response and coordinating, by the second entertainment apparatus, the downloading of the at least part of said preview version of the video game.

9. A system comprising a first entertainment device and a second entertainment device connectable via a network, the system being operable for the transfer of a preview version of a video game from the first entertainment apparatus to a second entertainment apparatus over a network;

said first entertainment apparatus comprising:

an extractor operable to extract said preview version of the video game from a package stored on a game disc, the package containing both a full version of the video game and said preview version of the video game, said preview version being an illustration of said full version of the video game;

a storage medium operable to store locally to said first entertainment apparatus said preview version of said video game in a directory that is exclusively used for distribution of data over the network; and a first processor operable to send a request to transfer at least part of said preview version of the video game to said second apparatus over the network;

and said second entertainment apparatus comprising:

a second processor operable to receive a request from the first entertainment apparatus to transfer at least part of said preview version of the video game to said second apparatus over the network, the second processor being operable to accept or decline the request;

wherein, in response to the second entertainment apparatus accepting the request, the second entertainment apparatus is operable to coordinate the transfer of said at least part of said preview version of said video game from said first entertainment apparatus to said second entertainment apparatus.

10. A system apparatus according to claim 9, whereby said network interface is connectable to a peer-to-peer type network.

11. A system according to claim 9, said first processor is operable such that before said preview version is uploaded to said second entertainment apparatus, the first processor transfers a test signal to said second entertainment apparatus over the network; and uploads said preview version in response to receiving, from said second entertainment apparatus, a positive response to said test signal.

12. A system according to claim 11, wherein said test signal comprises a wake-up over Internet signal.

13. A system according to claim 9, wherein the first processor is operable to send, via said network, an identification signal identifying said second entertainment apparatus to a server, and receive from said second entertainment apparatus a control signal, whereby said at least part of said preview version of the video game is uploaded to the second entertainment apparatus in dependence on said control signal.

14. A system according to claim 9, whereby said network interface is operable to receive a data signal from a central server uniquely identifying a different entertainment apparatus and at least one other entertainment device, and, in response to said data signal, said second processor is operable to send a control signal to said different entertainment apparatus and said at least one other entertainment device defining a portion of said preview version of the video game to be transferred therefrom.

15. A system according to claim 9, whereby the second processor is operable to allocate a predetermined amount of non-volatile memory space to said preview version of the video game; receive, using the network interface, data indicating the size of said preview version of the video game; and compare the size of the preview version of said video game with said pre-determined amount of non-volatile memory, whereby the transfer of said preview version of the video game will take place only in the event that the size of said preview version of the video game is smaller than the predetermined amount of non-volatile memory.

* * * * *